US012720159B2

(12) United States Patent
Hou

(10) Patent No.: US 12,720,159 B2
(45) Date of Patent: Aug. 25, 2026

(54) METHODS AND SYSTEMS FOR STREAMING VIDEO

(71) Applicant: Pluto Inc., West Hollywood, CA (US)

(72) Inventor: Vibol C. Hou, Long Beach, CA (US)

(73) Assignee: Pluto Inc., West Hollywood, CA (US)

( * ) Notice: Subject to any disclaimer, the term of this patent is extended or adjusted under 35 U.S.C. 154(b) by 0 days.

(21) Appl. No.: 19/020,940

(22) Filed: Jan. 14, 2025

(65) Prior Publication Data

US 2026/0032311 A1 Jan. 29, 2026

Related U.S. Application Data

(60) Provisional application No. 63/674,947, filed on Jul. 24, 2024.

(51) Int. Cl.
*H04N 21/458* (2011.01)

(52) U.S. Cl.
CPC ................................ *H04N 21/458* (2013.01)

(58) Field of Classification Search
None
See application file for complete search history.

(56) References Cited

U.S. PATENT DOCUMENTS

| | | | | |
|---|---|---|---|---|
| 9,258,589 | B2 | 2/2016 | Grouf et al. | |
| 2015/0032769 | A1* | 1/2015 | Rose | G06F 16/487 707/769 |
| 2017/0277699 | A1* | 9/2017 | Miller | G06Q 10/0631 |
| 2020/0097095 | A1 | 3/2020 | Sirpal et al. | |
| 2020/0153676 | A1 | 5/2020 | Bradbury et al. | |
| 2022/0217433 | A1* | 7/2022 | Krugly | H04N 21/26258 |
| 2022/0286750 | A1 | 9/2022 | Trollope et al. | |
| 2022/0321957 | A1* | 10/2022 | Mountain | H04N 21/4882 |
| 2023/0388601 | A1* | 11/2023 | Panchaksharaiah | H04N 21/4788 |
| 2024/0205514 | A1 | 6/2024 | Barabas et al. | |
| 2024/0305854 | A1 | 9/2024 | Hou | |

(Continued)

FOREIGN PATENT DOCUMENTS

WO WO-2022240526 A1 * 11/2022 ............. G06Q 10/00

OTHER PUBLICATIONS

U.S. Appl. No. 18/829,641, filed Sep. 10, 2024, Valenzuela et al.

*Primary Examiner* — Ricky Chin
(74) *Attorney, Agent, or Firm* — Knobbe, Martens, Olson & Bear LLP

(57) ABSTRACT

Systems and methods are disclosed configured to enable dynamic control of content streaming and/or to control content streaming so as to reduce peak system loads. A user electronic timetable is accessed from memory and is amazed to identify future unscheduled time periods. A first learning engine classifies timetable entries into subject types. A watchlist comprising a plurality of content items of respective time lengths is accessed. A second learning engine utilizes the classification and the time lengths to generate a scheduling recommendation of at least one item of content on the user watchlist. The scheduling recommendation is transmitted over a network to the user device. If the recommendation is accessed, a timetable entry is generated corresponding to the scheduling recommendation The at least one item of content on the user watchlist is streamed to the first device of the user in accordance with the accepted scheduling recommendation.

14 Claims, 6 Drawing Sheets

(56) References Cited

U.S. PATENT DOCUMENTS

| | | | | |
|---|---|---|---|---|
| 2024/0305865 | A1 | 9/2024 | Hou | |
| 2026/0032311 | A1* | 1/2026 | Hou | H04N 21/458 |

* cited by examiner

METHODS AND SYSTEMS FOR STREAMING VIDEO

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present disclosure is related to video streaming over a network and to the enhancement of such video streaming.

Description of the Related Art

Streaming video services have become an essential form of content consumption. However, disadvantageously, many users may stream content at the same time, requiring enormous amounts of network bandwidth and server resources to handle peak loads.

In addition, it can be difficult for viewers to manage the pace and timing of their viewing. This may result in a lack of desirable content for a given viewer at a given point in time.

Figure 1:
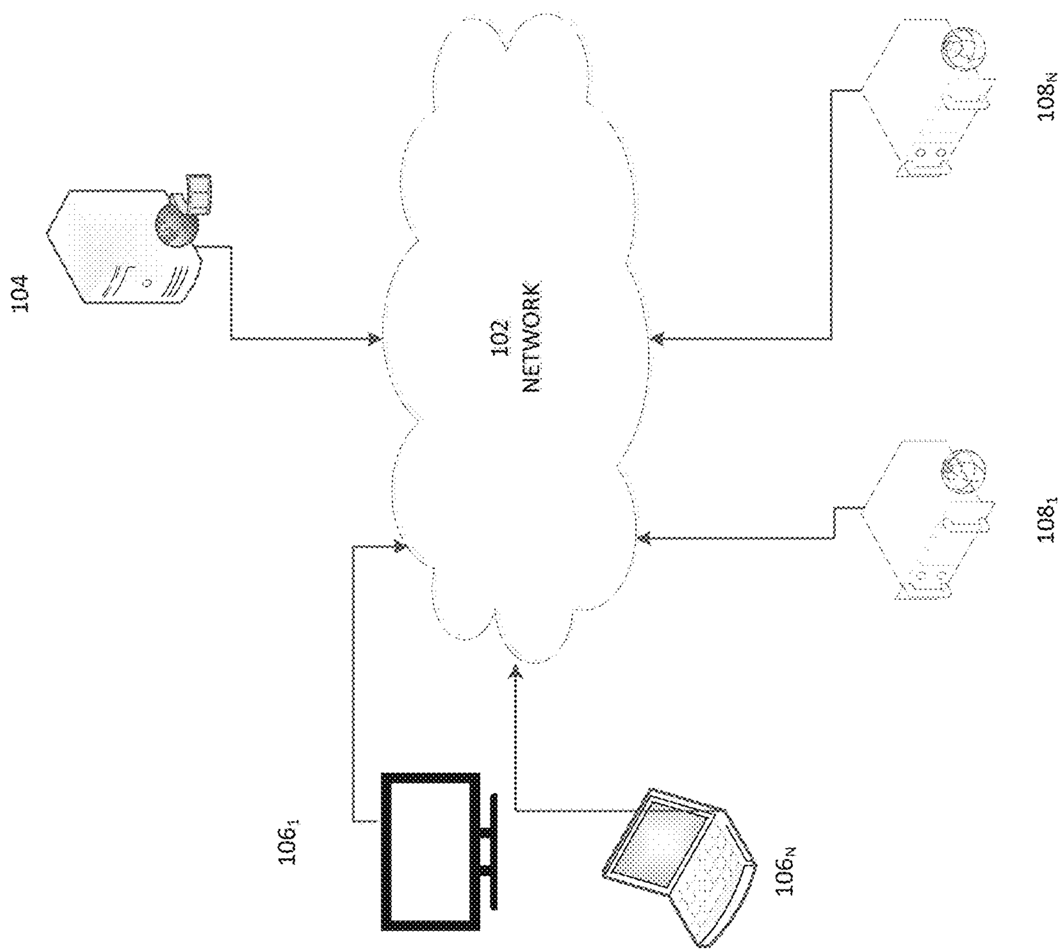
FIG. 1 illustrates an example environment.

While each of the drawing figures illustrates a particular aspect for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

An aspect of the present disclosure relates to methods and systems configured to control the pacing and timing of video streaming and viewing. Another aspect of the present disclosure relates to controlling the timing of streaming content so as to reduce peak loading on streaming infrastructure.

As similarly discussed elsewhere herein, streaming video services have become an essential form of content consumption. However, disadvantageously, it can be difficult for viewers to manage the pace and timing of their viewing. Further, many viewers tend to rapidly view all the episodes of a given series (sometimes referred to as binging), rapidly exhausting content that the user may be interested in. This may result in a lack of desirable content for a given viewer at a given point in time. In an attempt to locate additional content, a user may need to navigate through large libraries of content to find and select a given item of content to view. Such navigation may consume significant network and computer resources of the streaming system and may necessitate a large number of communications between the viewer device and the streaming system.

For example, each time a user searches for content, the user may enter a search query in a search bar presented via a user interface rendered on a client (e.g., a browser hosted on a user device or an application hosted on a user device, where the user device may be a smart phone, a tablet, a laptop computer, a desktop computer, a set top box, a streaming stick, a connected television, a VR or AR headset, or the like). The user may then submit the search query (e.g., by pressing Enter or clicking a search button). The client may transmit the search query (e.g., by transmitting an HTTP GET or POST request with the search query over a network to a streaming service server). For example, the request may include parameters that specify the query text and other filtering options (e.g., genre, release date).

The server then needs to process the search query by querying its content database or search index to find relevant matches. The server sends back a response containing a list of search results (e.g., comprising titles, thumbnails, descriptions, and the like) consuming still additional network bandwidth and computer resources. The client receives the response and dynamically updates the user interface, displaying the search results to the user.

If the user desires to navigate through the search results or content library, still additional computer and network resources are utilized. For example, the user may click on a category, filter, or pagination control to browse through the library. The client may, in response, transmit another HTTP GET request over the network to the server, specifying the new category, filter, or page number. The server then needs to access corresponding thumbnails and descriptive text from a content data store, and to respond to the request with a new set of content comprising the thumbnails and text that matches the specified category, filter, or page. The client then needs to process the new response and update the displayed content accordingly.

The user continues to interact with the streaming service, performing additional searches, applying filters, or navigating through different categories and pages. This results in a series of asynchronous HTTP requests and responses consuming additional computer resources.

Thus, it would be desirable to reduce such utilization of computer and network resources by enabling content desired by the user to be provided to the user in a controlled manner. Further, it would be desirable to reduce peak system and network utilization to enhance the resolution of video that can be streamed to user devices and/or to reduce the amount of streaming infrastructure needed to handle peak loads.

An aspect of the present disclosure relates to systems and processes that enables a user to control the pace of the streaming of episodes of a series. For example, the streaming system may determine that a user may be interested in viewing a given series or is currently viewing a series. By way of illustration, the user may have added a series to a watchlist or given a like indication to a given series episode. A prompt may be transmitted from the streaming system to a user device which may provide a menu or other interface that enables the user to specify at what frequency and/or at what time episodes are to be made available to the user for streaming to the user device. Optionally, such a prompt may also be provided to the user in response to detecting that the user has just completed viewing a first episode of a series.

For example, a user interface may enable the user to control a frequency/interval setting via which the user can control the pace at which the user can watch the next episode of a given series, such as daily, every other day, every third day, weekly, monthly, or other period (even if all the episodes for the series have been released in actuality). Optionally, the user interface enables the user to specify a release interval that is relative to the user viewing of a released episode. For example, if a first episode of a series is released, and the user specified that the release interval is weekly, then the second episode will be released one week after the user actually completed viewing the first episode (where completed may comprise watching 95% or more of the episode).

Optionally, a user may specify via a user interface the day of the week on which episodes are to be released to the user (e.g., Sunday, Monday, Tuesday, Wednesday, Thursday, Friday, Saturday). Optionally, a user may specify via a user interface the time of day on which an episode is to be released. Optionally, a preference user interface may be provided via which a user can specify that all series are to be released on a user-specified schedule and/or that certain genres of series are to have their episodes released on a user-specified schedule. For example, the user interface may enable the user to specify different release schedules for the reality genre, mystery genre, comedy genre, drama genre, and so on.

If the user specifies that a given series should be released on a corresponding specified schedule/interval prior to watching any episodes, the first episode of the series will be the first episode made available to the user (where, if the episode is generally available to users, it is likewise immediately available to the user), the second episode will then be made available at the next interval and so on. Optionally, the user may request that the release date/time be added to a user calendar (e.g., an electronic timetable of the user), such as the calendars discussed herein. The disclosed system may then accordingly add the user-customized episode release schedule to the user's calendar as respective calendar entries. A calendar entry may comprise a corresponding program name, program description, episode description, episode name/number (e.g., season number and episode number), and/or a link to the episode. The episode link may comprise a URL or other locator to the corresponding episode which when activated by the user will cause the episode to begin playing or will present an episode play control.

Optionally, a user interface may be provided via which a user can override a previously specified release schedule to enable the user to view an episode prior to its "user-scheduled" release. For example, the override may be a one-time override for a single episode, or the user may turn off the periodic release for the series entirely so that all episodes (that have been generally released to the public) are immediately available. In response to a one-time override for a single episode the next episode scheduled to be released may be immediately made available to the user and may appear in user searches and/or user watchlists (which may include user specified watchlists and a system assembled watchlist, such as a "continue watching" watch list.

Thus, each user may have a customized release schedule for one or more series, which may be different than the release schedule for another user (where a given episode may be available to a given user, while the same given episode may be made available to second user at a later time in accordance with the second user's release schedule). This enables a user to view episodes at a pacing and schedule most suitable for the user. In addition to the technical benefits discussed herein, the customized pacing enhances the viewer experience as they will not burn through their favorite series and have nothing left to watch.

For example, if a series is an on demand series, a home screen may have a "continue watching section" section, a "my shows" section", or the like (which may be generally referred to as a watchlist). Unwatched episodes of series that a user previously added to their watchlist and specified are to be periodically released to the user may appear in the watchlist in accordance with the user-specified release period. If the user has already watched a given episode of a given series, and the next episode is not yet to be released based on the user-specified release schedule/period, then the next episode will not yet appear in the watchlist. Optionally, the next episode will instead appear in the watchlist with a text and/or icon that indicates that the episode is not yet available for viewing and providing the date at which the episode will be available for viewing (in accordance with the user-specified release schedule/period). Optionally, once an episode is viewed, it will be removed from the watchlist.

If the user does not watch a given episode that has been released in accordance with the user-specified schedule/period, optionally the next episode will not be released until the given episode is viewed by the user. Optionally, once the given episode is viewed by the user, the next episode will not be "released" to the user until the user-specified interval has elapsed.

A user may be watching a given series via linear streaming television. Linear streaming may provide a plurality of different programmed channels of streaming content (e.g., via content) corresponding to different genres, networks, and/or programming services, with programs scheduled on specified days with specified start and end times. Thus, such streaming content may be transmitted to viewers in a continuous and sequential manner, scheduled by the channel, network and/or programming service. A navigable electronic program guide may be provided for display on a user device (e.g., via a browser or dedicated streaming application), where the electronic program guide may list channels, programs for the respective channels, and start and end time for the respective programs. A user may be enabled to scroll through the channels and may select a given program that is currently playing. In response, the selected program may be streamed to and displayed by the user device (e.g., via a browser or dedicated streaming application).

A given series may have its episodes scheduled to play on certain days and specified start times. Such scheduled play times may be displayed to a user via the electronic program guide. However, if a user has specified a release schedule (e.g., the period at which episodes of the series are to be released and/or a release day), then the electronic program guide for the user may be customized to display an entry for given episode of the series in accordance with the user's release schedule. Optionally, entries for the episode may be inserted in multiple time slots and/or in multiple channels in the electronic program guide. Optionally, once the user has viewed the episode, the other entries for the episode may be removed and replaced with entries for the originally scheduled program or other content.

If there are other entries for the episode in the non-customized electronic program guide (in association with one or more channels), then system may identify substitute programs of the same length (e.g., plus or minus 1 minutes, 2 minutes, or 4 minutes) and insert corresponding entries in the electronic program guide customized for the user while removing the entries for the episode. If the user then views the corresponding channel at the corresponding time, the substitute content may be accordingly streamed from the system to the user device. Thus, optionally, a given user may receive and view a customized electronic program guide, different than the electronic program guides provided to other users.

Optionally, if third party secondary content, such as advertisements, are to be inserted into a given episode via an auction, the potential bidders for a corresponding impression may be notified that the episode has been released in accordance with a user-specified release schedule, which may enhance the value with respect to a potential placement of such third party content, and hence may result in relatively higher bids.

Figure 4:
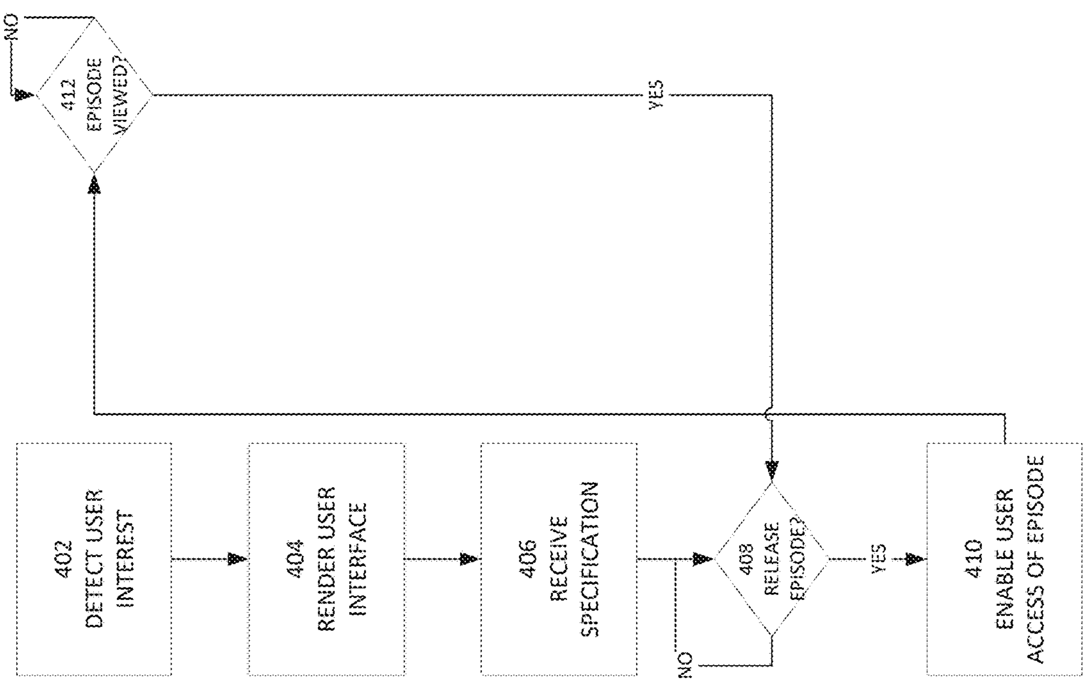
FIG. 4 illustrates an example process.

Although, as described herein, a user may manually specify a release schedule for episodes of a given series, optionally an artificial intelligence engine employing machine learning (e.g., utilizing a neural network, such as illustrated in FIG. 4) or other process may be utilized to set or recommend a release schedule for episodes of a given series. For example, the artificial intelligence engine may vary how quickly episodes for a series are released for a given user and learn which placement tends to result in the lowest schedule overrides by the user, the highest acceptance rate of a release schedule recommendation, the lowest rate of release rate recommendation edits, and/or result in the highest likelihood that the user will, over time, view all the episodes with respect to a given series. The foregoing factors may be weighted differently in training the learning engine. Thus, optionally, each user or each set of users (where a given set of users may have similar viewing habits and may view similar series) may have a learning engine trained for them. Such a learning engine may then later be retrieved and used to generate release schedules or release schedule recommendations which may be presented to the corresponding user (or set of users).

Where a learning engine is used to generate a release schedule recommendation, the recommendation may be presented to a user in association with a control via which the user may accept the recommendation, edit the recommendation, and/or ignore the recommendation (or optionally provide a user-specified release schedule). The user's response to the recommendation may then be stored in memory in association with the user's account and may be utilized to control the release of episodes as described elsewhere herein.

As will be described, a prediction/scheduler system may utilize one or more of a deep neural network (see, e.g., FIG. 3), a generative adversarial network, a genetic algorithm, a rules engine, a knowledge graph, a generalized Fibonacci sequence, a clustering algorithm, a recommender algorithm, and/or other technique for predicting user reactions to release recommendations and for using the predictions to determine and schedule (or generate schedule recommendations) placement of such episodes (e.g., to reduce or minimize schedule overrides by the user, to increase or maximize acceptance rates of a release schedule recommendation, to reduce or minimize release rate recommendation edits, and/or to increase or maximize the likelihood that the user will, over time, view all the episodes with respect to a given series).

The prediction and/or scheduler technique used may be selected based on one or more criteria. For example, certain techniques may be faster, more accurate, require less training data, and/or require less computer resources (e.g., less memory or processor bandwidth) than other techniques, and such factors may be utilized to select the optimum technique for a given situation.

By way of illustration, genetic algorithms may require less training data than neural networks (which need a sufficient number of representative examples in order to be configured to capture the underlying structure that enables the neural network to generalize to new cases). Further, genetic algorithms may, in certain scenarios, generate relatively higher-quality solutions to optimization problems. However, a genetic algorithm may take a longer time to find an acceptable solution. By contrast, a neural network may take longer to train, but then can almost instantly classify new inputs using relatively less processing bandwidth.

As similarly discussed above, there may be several algorithms/techniques that may be used to predict a given user's (or set of users') response to different episode release schedules and to determine an optimum release schedule (e.g., release interval or period) for a given user or set of users. Such algorithms/techniques may be stored in respective pools of algorithms/techniques.

The best performing algorithm/technique may be identified from the pool, and selected for use for a given user or set of users (e.g., based on the average performance of the algorithm/technique). The algorithm/technique selection algorithm may take into account the speed with respect to finding a solution, the accuracy in identifying the optimum episode release schedule (e.g., as determined by the frequency in which a user overrides, edits, or ignores a release schedule recommendation), the amount of training data needed, the processor bandwidth needed, and/or the amount of memory needed. The selection may be dynamic or static. The selection may be performed periodically or in response to certain events (e.g., detection of a new video series or the user viewing a first episode in a series).

The inputs to a given prediction and/or scheduler model/engine may include some or all of the historical user viewing and/or behavioral information discussed herein. For example, an artificial intelligence engine may be configured to identify correlations between the input information and the user's historical responses to episode scheduling recommendations with various recommendations and/or to scheduled episode releases. The correlations may then be used in performing predictive analytics to determine how a user will respond to various episode release sc.

Figure 3:
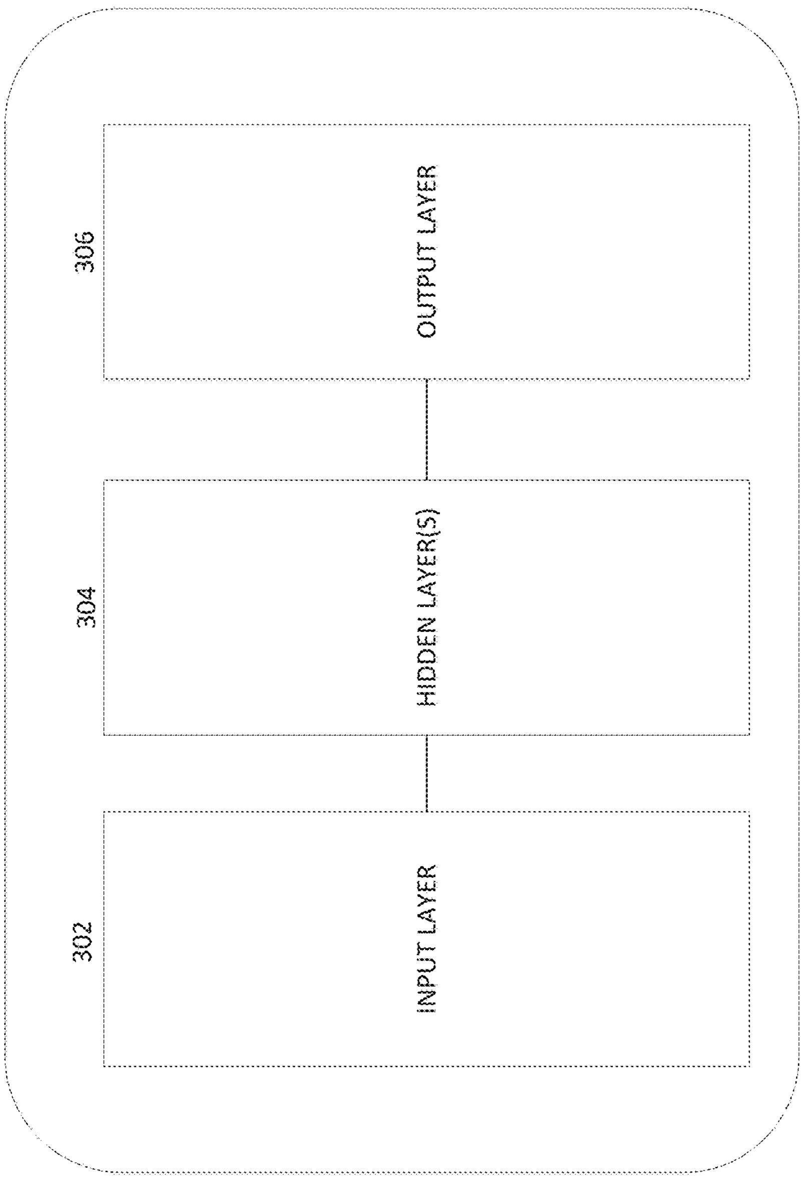
FIG. 3 illustrates an example neural network architecture.

As discussed herein, the prediction/scheduler system may optionally include a learning engine comprising a neural network (see., e.g., FIG. 3). The neural network may include one or more layers (e.g., hidden layers) of one or more nodes. A given node may input one or more items of information, such as a user's historical responses to episode scheduling recommendations or to the actual release of episodes. The node may differently weight various inputs. The weighted inputs may be summed, and a function may be applied to the summed weighted inputs to generate a prediction as to a user's response to episode scheduling recommendations or to the actual release of episodes. The prediction may be compared to the user's actual historical response. If there is a difference, the difference constitutes a prediction error. The weights may be adjusted accordingly, and the prediction may be performed again to determine if the error has decreased or increased. The weights may be repeatedly adjusted until the error cannot be reduced any further or until a certain number of iterations have been performed. A gradient descent process may be utilized to reduce the error.

The weights for such minimized error may then be used to predict a future user response to a given episode scheduling recommendation or to the actual release of episodes, and hence in determining what to recommend for episode scheduling and/or when to release episodes for a given user or set of users.

Optionally, in addition to or instead of performing episode releases on a regular customized intervals, a user's calendar of other events may be accessed. The system can gain access to a user's online calendar by the user granting permission to access (e.g., subscribe to) the user's calendar. By way of example, the user may provide the system with a link to subscribe to the user's calendar which may be activated by the system in order to access the user's calendar. The calendar may be periodically accessed to identify calendar updates (e.g., 6:30 AM of the user's time zone or at a time specified by the user) or calendar updates (e.g., new scheduled activities, edited calendar entries, deleted calendar entries, and/or the like) may be pushed by a calendar application to the system in real time.

Based on events scheduled on the user's calendar (which may include an event description, an event start time, an event end time, and invitees), the artificial intelligence engine may generate recommendation(s) for viewing dates and timing or, if the user's streaming client is active, may automatically stream a given episode or other content item (e.g., movie, sporting event, concert, etc.) based on the date(s)/time(s) generated by the artificial intelligence engine. For example, the artificial intelligence engine may identify via the user's calendar unscheduled time periods of sufficient length for typical viewing times in generating such date/time streaming recommendations and/or in automatically streaming a content item (e.g., an episode, movie, sporting event, concert, etc.). The system may limit scheduling to typical streaming content viewing times. A typical viewing time may a general typical viewing time for all viewers in the user's region (e.g., "prime time", such as between 8 PM-11 PM) or specific typically viewing times for the user (e.g., as determined historical viewing information for the user stored in the user's account record). By way of illustration, if the user is retired and does not work, the user's typical viewing times may be 8 AM-11 AM and 7 PM-10 PM. Optionally, the user may provide via a preference user interface at which times the user does or does not want to view streaming content from the viewers playlist, as similarly described elsewhere.

Optionally, there may need to be a minimum amount of continuous available time in order for content to be selected and/or a recommendation to be generated for that time. For example, the minimum time threshold may be set to typical shortest content item length (e.g., 20 minutes or 30 minutes). Optionally, the minimum time threshold may be set to a shorter amount of time (e.g., 2 minutes, 4, minutes, 6 minutes, etc.) which may be suitable for short form content or for a portion or preview of a full content item. It is understood that although the phrase episode may be utilized, any other type of streaming content item may be used, unless the context indicates otherwise.

In particular, the artificial intelligence engine may utilize some or all of the following information accessed from a user's calendar in determining what content items (e.g., episodes of what programs) should be scheduled (or recommended to be scheduled) on which dates and times:

Event Title: Provides the name or subject of the event.

Date and Time: Includes start and end times.

Location: Indicates where the event is taking place, whether physical or virtual.

Participants: Lists the attendees.

Description/Notes: Offers additional details about the event.

Reminders/Alerts: Includes notification settings to remind users about the event.

Recurring Details: Information about event repetition, important for ongoing scheduling.

The artificial intelligence engine may identify available time periods in the user's schedule in determining when to schedule the viewing of a given content item of a given series or recommend that the given content item be viewed. For example, if the user has a meeting or overseas trip scheduled, the artificial intelligence engine may be configured to avoid scheduling a content item during that time. In identifying available time periods in the user's schedule, the artificial intelligence engine may determine which content items the user has not yet watched of programs on the user's watchlist (or which the engine determines that the user is likely to want to watch using collaborative filtering and/or other techniques) and may access content item metadata such as content item length. The artificial intelligence engine may determine which content items are short enough to fit into a given available period. From those unwatched content items that are determined to be short enough to fit into a given available period, one or more content items of respective programs may be recommended to the user to add to the user's calendar (e.g., the calendar from which the schedule information was obtained or a separate watchlist calendar that may be hosted by the system). Optionally, where there are multiple available time slots, a time slot may be selected so as to be at a time of relatively low network bandwidth utilization. This aids in distributing utilization load over time with respect to the network utilization. Optionally, where many users tend to have common available time slots, different times slots may be selected for different users so as to further reduce peak network utilization and to better balance network loading over time.

Where there are more than one unwatched episodes of different programs that will fit into an available time period, the system may optionally select one of such episodes based on one or more criteria such as episode content information and/or user information (e.g., genre, date of release, the number of episodes in a given program previously viewed by the user, user viewing patterns, the user's inferred mood, and/or other criteria). For example, the genre of the episodes may be obtained from metadata associated with the episode. Based on the time of day, day of the week, scheduled meetings (and optionally related data, such as meeting subject, meeting attendees, meeting location and/or other meeting information, such as that disclosed here) before and/or after the available time period, the user's viewing patterns (e.g., accessed from a user profile stored in memory), and/or episode genre data, the artificial intelligence engine may select the episode that the engine determines will be the one the user would most prefer to watch at that time period.

By way of example, if a user has a business meeting scheduled just before or just after the available time period, and the user's viewing history indicates that the user has previously manually selected comedies to view during breaks between business meetings, the artificial intelligence engine may select a relaxing comedy episode to play or to recommend for playing during the time period. On the other hand, if the time period is at 9 PM, and the user's viewing history indicates that the user has previously manually selected dramas to view at 9 PM or later, the artificial intelligence engine may select a drama episode. By way of additional example, if the user typically watches news at 8 AM, the engine may recommend news shows for open 8 AM slots. By way of further example, if the user's viewing history indicates that the user does not view streaming content during certain time periods (e.g., work hours, while running, etc.) the system may not provide any recommendations for such time periods even if the calendar indicates the user has open time periods with no activities or meetings scheduled.

Optionally, when there are multiple episodes of different programs from the user's playlist that will fit into an available time slot they may be presented to the user via a rotatable carousel user interface comprising a series of respective images (e.g., optionally including text comprising a program title, an episode title, a season number, an episode number, and/or a description of the episode) of the different available episodes from the user's watch list. The images may be still or video images. For example, the images may correspond to a trailer for the episode or an initial portion of the episode. The carousel may rotate either horizontally or vertically, enabling a user to view and select different images corresponding to video episodes for playback and/or to obtain additional information regarding the episodes. Arrow buttons may be provided on either side of the carousel to enable the user to navigate to the previous or next item in the carousel. Optionally, small dots or thumbnails may be provided and rendered below the carousel to indicate the number of episodes in the carousel and a currently selected episode. Optionally, the carousel may be configured to automatically rotate through the episodes at a set interval, optionally with the option for the user to pause this rotation by activating a pause interface. The carousel may automatically adjust its layout and behavior based on the device and screen size, ensuring a seamless experience on desktops, tablets, and smartphones. For example, CSS media queries may be utilized to detect the screen size and apply different styles to adjust the layout and style of the carousel based on the screen size of the device. The carousel layout may utilize percentage-based widths so it can scale smoothly across different screen sizes.

Optionally, a Natural Language Processing (NLP) engine may be utilized to determine if a calendar entry is work-related or personal by analyzing the textual content of the calendar entries. The NLP engine may be trained to recognize whether a calendar entry is work related or personal.

For example, a dataset of labeled calendar entries (e.g., subject data, calendar entry notes, etc.) may be collected, with a given entry categorized as either work-related or personal. Preprocessing may be performed on the training data set. For example, unnecessary characters, punctuation, and/or whitespace may be removed from the calendar entries. The calendar entry text may be tokenized into individual words or tokens. Optionally, the text may be converted to lowercase to ensure uniformity. Stop words removal may be performed, wherein common words that do not contribute sufficient meaning (e.g., "and", "the") may be removed. Stemming/Lemmatization may be performed to reduce words to their root form (e.g., "meetings" to "meeting").

Feature extraction may then be performed. Text may be represented as the frequency of each word in the text. Term Frequency-Inverse Document Frequency (TF-IDF) may be utilized, wherein the word frequencies are adjusted based on how common or rare they are across all entries. Pre-trained word embeddings or contextual embeddings may be utilized to capture semantic meaning.

An NLP classification model may be trained using labeled data. By way of example, the model may comprise Logistic Regression, Support Vector Machines (SVM), Random Forests, and/or neural networks. By way of further example, Recurrent Neural Networks (RNNs), Long Short-Term Memory networks (LSTMs), or Transformers may be utilized.

Feature engineering may be performed, wherein text features are combined with additional metadata (e.g., time of day, location, invitees, and/or the like) if available.

The model may be evaluated. The dataset may be split into training and test sets. The model may be evaluated using metrics, such as accuracy, precision, and/or recall. If the model is sufficiently accurate in classifying calendar entries as work-related or not work-related, the trained model may be used to classify new calendar entries as work-related or personal. Such appointment classifications may be utilized in generating recommendations with respect to episodes, other content items, and the scheduling thereof.

Optionally, the user may expressly provide selection and scheduling criteria via a user interface. For example, the user may specify specific programs and genres for which recommendations are to be provided (or are not to be provided). By way of further example, the user interface may enable the user to specify dates and/time periods for which recommendations are to be scheduled for, and/or may enable the user to specify dates and/or time periods that are to be excluded from recommendations. The user-specified criteria may be stored in memory in association with a user record and the system may provide program and schedule recommendations accordingly.

Where recommendations are presented to the user, the recommendations may be provided via a user interface comprising the recommendations, the user's calendar, and/or the user's watchlist. If the user accepts a recommendation (e.g., by activating a corresponding control), optionally, the recommendation is added to the user's calendar as a calendar entry (e.g., including the program name, the episode name/number, an episode description, the episode start date/time and ending date/time). The calendar entry may include a link to the episode (or other content item). The episode link may comprise a URL or other locator to the corresponding episode. Activation of the link (e.g., by the user clicking on or selecting the link) may navigate the user's browser or video streaming application to the corresponding episode (or other content item), and the episode may automatically start playing or may play in response to the user activating a play control.

The recommendation user interface may be automatically periodically presented to the user and/or may be presented to the user in response to the user activating a recommendation request control presented via the user device. For example, the recommendations may be presented to the user via the streaming application each time the user initially opens the streaming application and/or at a specified time (e.g., 8:30 AM). Such a user interface may be presented while the user is accessing an electronic program guide (e.g., as a pop-up user interface). Optionally, the recommendations may be transmitted to the user via a short messaging service message, email, and/or other electronic communication. Optionally, a pop-up user interface may be presented periodically or in response to the user opening an application, the pop-up user interface providing a summary of scheduled episodes and programs. Optionally, in addition or instead, the pop-up user interface may include other content, such as news content, information about new episodes for programs on the user's watchlist, new releases, and/or the like. It is understood that the foregoing user interfaces do not have to be formatted as pop-up user interfaces, and can instead be presented as part of another user interface.

Thus, by way of illustration, the following is an example scenario.

The system may Identify the 8:00 PM to 10:00 PM time period as open (as determined from a user calendar) and a suitable time for viewing streaming content (based on the user's viewing history).

The system may access the user's viewing preferences, and determine that the user prefers to watch dramas or comedies in the 8:00 PM to 10:00 PM time period.

The system may select one or more episodes or other content items that fit within the 2-hour window. For example, the system may recommend two 45-minute drama unwatched episodes from the user's watchlist (which may be sequential episodes from the same program, or may be from two different programs), and may also or instead suggest three 30-minute comedy unwatched episodes from the user's watchlist (which may be sequential episodes from the same program, or may be from two or three different programs). The user may accept or reject all the recommendations or individual episode recommendations. Optionally, in response to a user rejecting a recommendation, the artificial intelligence engine may immediately generate a new recommendation and/or a lower ranked previously generated recommendation may be provided.

Optionally, a full evening of episodes may be recommended. For example, if a given evening (e.g., 8 PM-10 PM) is determined to be open for the user's calendar, and if a user typically watches family friendly shows (e.g., having a "family" genre assignment, having a rating of suitability for 12 years old and older, etc.) the artificial intelligence engine may generate a recommendation of several episodes and/or movies to be streamed and displayed during the evening time frame that are family friendly. Thus, the artificial intelligence engine may generate what acts as a linear television channel, with multiple episodes and/or movies with specified stop and end times. A channel timeline, displaying the program/episode names with associated start and end times may be generated and displayed via the user device. Optionally, a user interface may be provided via which the user may select a genre-type for a given time period, and the engine may provide recommendations in accordance with the user-specified genre.

The system may transmit these recommendations to the user's device which may render the corresponding user interface with the recommendations. The user may then select one or more the recommended episodes for viewing. Optionally, the user interface may enable the user to specify the ordering of the playback of the episodes (if more than one episode is recommended). Optionally, the user's selection and/or ordering may be added to the user's calendar at the corresponding time, with the program name, episode name/number, and episode description. As similarly discussed elsewhere herein, the calendar entry may include a link to the episode (e.g., a URL or other locator). Activation of the link (e.g., by the user clicking on or selecting the link) may navigate the user's browser or video streaming application to the corresponding episode, and the episode may automatically start playing or may play in response to the user activating a play control.

If the user does not watch a given episode, optionally the artificial intelligence engine may automatically (or in response to a user request) reschedule the given episode to a new date and/or time and update the user's calendar to reflect the new date/time and a new or edited calendar entry (e.g., including some or all of the calendar entry data discussed herein, such as the program name, episode name, season number, episode number, episode description, link to the rescheduled episode, and/or the like). Such rescheduling and/or calendar update may optionally be performed in real time in response to detecting that the user has not watched the given episode. Optionally, the user may edit or delete a calendar entry for an episode and/or other content item. In response to detecting such deletion, the system may transmit a query to the user device asking if the user wants to reschedule the episode and/or other content item. If the user replies affirmatively (e.g., by activating a reschedule request control), the system receives the user's affirmative reply and will reschedule the episode at another available time period. If the user replies affirmatively (e.g., by activating a reschedule request control), the system receives the user's negative reply, the system will not reschedule the episode or other content item.

In addition, optionally in response to detecting that the user has added an event to the user's calendar (e.g., as determined via a periodic access of the calendar or a push notification from the calendar) that conflicts with a scheduled episode or other content item, the system may reschedule the episode or other content item to a different availability time period and may update the user's calendar accordingly (optionally a notification of the rescheduling may be electronically transmitted to the user via email, text message, and/or otherwise). Optionally instead, the system will delete the calendar entry for the episode or other content item rather than reschedule it. Optionally, the system will provide a prompt to the user asking whether the user wants to reschedule the episode or other content item. If the user approves rescheduling of the episode or other content item, the system may reschedule the episode or other content item accordingly (e.g., using the scheduling techniques and processes described herein) and update or replace the corresponding calendar entry. If the user does not approve the rescheduling, the system may delete the calendar entry for the episode or other content item without rescheduling the episode or other content item.

The artificial intelligence engine used to select episodes or other content items based at least in part on the user's calendar may comprise a learning engine, such as a neural network (see, e.g., FIG. 3). The learning engine may input the user's watchlist comprising episodes and programs the user has watched or intends to watch and related metadata to provide contextual information (e.g., genre, date of release, actors, number of episodes in the program, how many episodes have been released, and/or other such data). In addition, the learning engine may input the user calendar(s) which may include a schedule of activities and meetings (optionally including related data such as attendees, location, an indication as to whether activity/meeting occurs at specified periods (e.g., weekly, monthly, bi-annually, annually, etc.) to identify available time slots and contextual data.

The learning engine may input explicit user preferences (provided by the user via corresponding user interfaces) and implicit user preferences, which may be based on the user's viewing history (e.g., when a user typically watches streaming content, the genres of content the user tends to view at different time periods, and/or the frequency at which the user typically watches episodes of a given program and/or genre of programs).

Feature engineering may be performed, wherein embeddings representing user preferences and behavior are generated (which may be referred to as user features) and embeddings representing episode metadata (e.g., genre, date of release, actors, number of episodes in the program, how many episodes have been released, and/or the like, which may be referred to as item features). In addition, embeddings may be generated that represent information derived from the user's calendar (e.g., available time slots, beginning and end of calendared events, event descriptions, event participants, event locations, and/or the like, which may be referred to as context features).

As described elsewhere herein, the neural network may include layers, where a given layer comprises neurons.

An input layer may receive user features, item features, and context features. The neural network may include embedding layers that convert user-specific data into dense vectors (user embedding). Episode metadata may be converted into dense vectors (item embedding). Contextual information may be converted into dense vectors (context embedding).

A concatenation layer may combine user, item, and context embeddings into a single vector.

The neural network may include one or more hidden layers, comprising multiple fully connected (dense) layers with activation functions (e.g., ReLU) to learn interactions between users, items, and context. An output layer (e.g., a sigmoid or softmax layer) outputs the probability of a user liking a particular episode in a given context.

As discussed above, the learning engine may be trained to better predict which unwatched episodes of programs on the user's watchlist the user would prefer to watch at a given available time period based on the user's calendar.

Data preparation may be performed, wherein a dataset of user-episode interactions, including contextual information is generated. For example, positive samples (e.g., where the user accepted an episode viewing recommendation and viewed the episode at the recommended time) and negative samples (e.g., where the user did not accept an episode viewing recommendation and did not view the episode at the recommended time) may be included in the dataset.

The neural network may utilize a loss function (e.g., binary cross-entropy for binary recommendation (like/dislike) or categorical cross-entropy for multi-class recommendation).

The weights of the neural network may be adjusted through the training process. The training process utilizes an optimization algorithm to minimize the error (or loss) of the network's predictions compared to the actual values. The weights in the network are initially set to small random values. This randomness helps in breaking the symmetry and ensures that the neurons learn different features. Bias terms may also be initialized (e.g., to zero or small random values). Forward propagation may then be performed as follows. The input data is fed into the network. A given layer neuron performs a weighted sum of its inputs and passes the result through an activation function (e.g., ReLU, sigmoid). The final layer produces the network's output. The network's output is compared to the true target values using a loss function (e.g., mean squared error for regression, cross-entropy for classification). The loss function measures the discrepancy between the predicted values and the actual values.

Backward propagation may then be performed. For example, the gradient of the loss with respect to a given weight may be performed using the chain rule of calculus. The partial derivative of the loss may be generated with respect to a given weight. Gradients may be utilized to update the weights in the direction that reduces the loss. A hyperparameter may be utilized to determine the step size for a given update. For example, one or more of the following techniques may be utilized to adjust weights. Stochastic Gradient Descent (SGD) may be utilized to update weights using the gradient of the loss function with respect to one or more training examples. Mini-Batch Gradient Descent may be utilized which employs a small random subset (batch) of the training data to compute and apply the gradient. Batch Gradient Descent may be utilized which computes the gradient using the entire training dataset.

Optimization may then be performed. For example, the network may be trained using an optimizer such as Adaptive Moment Estimation which computes adaptive learning rates for a given parameter by keeping track of both the first moment (mean) and the second moment (uncentered variance) of the gradients. The optimizer optionally incorporates the concept of momentum to smooth the optimization path and accelerate convergence. The optimizer optionally includes bias correction terms to counteract the biases introduced during the initialization of the moment estimates. Advantageously, Advanced Moment Estimation is computationally efficient and has relatively low memory utilizations. Further, Advanced Moment Estimation converges faster than conventional optimization methods. Dropout, batch normalization, and early stopping may be utilized to prevent or reduce overfitting.

The neural network model performance may be evaluated using metrics such as AUC, precision, recall, and/or F1-score. Offline evaluations may be employed using historical data and online A/B testing to assess real-world performance.

Certain additional aspects will now be described with reference to the figures.

FIG. 1 illustrates an example environment. A content composer system 104 (which may include a stitcher component, such as a server, providing stitcher services or where a stitcher system may include a content composer component, or where the content composer and the stitcher may be independent systems) is connected to a network 102. The content composer system 104 is configured to communicate with client devices $\mathbf{106}_1 \ldots \mathbf{106}_n$ (e.g., associated with users of a streaming service) that comprise video players. By way of example, the video player may be embedded in a webpage, may be a dedicated video player application, or may be part of a larger app (e.g., a game application, a word processing application, etc.). The video player may be configured to play video and/or audio content, including primary content and ancillary content. For example, the content composer system 104 may receive a request for media from a given client device 106 in the form of a request for a playlist manifest or updates to a playlist manifest.

The content composer system 104 may identify, from a file, the location and length of an ancillary content pod, such as an interstitial pod (a time frame reserved for ancillary content, such as interstitials, wherein one or more interstitials may be needed to fill a pod, wherein an item of ancillary content may be in the form of interstitial content), determine context information (e.g., information regarding the primary content being requested, information regarding the user, and/or other context information), solicit and select interstitial content from third parties, define customized interstitials as described herein, generate playlist manifests, and/or perform other functions described herein. The content composer system 104 and/or another system may stream requested content to the requesting device 106.

Optionally, the content composer system 104 may transmit context information to one or more interstitial source systems $\mathbf{108}_1 \ldots \mathbf{108}_n$. For example, the source systems $\mathbf{108}_1 \ldots \mathbf{108}_n$ may optionally include ad servers, and the interstitial content may comprise ads. The interstitial source systems $\mathbf{108}_1 \ldots \mathbf{108}_n$ may comply with the VAST protocol.

By way of further example, the interstitial source systems $108_1$ . . . $108_n$ may provide public service videos, previews of upcoming programs, quizzes, news, games, and/or other content. The interstitial source systems $108_1$ . . . $108_n$ may use the context information in determining what interstitial content is to be provided or offered to the requesting client device 106. Optionally, as part of a decisioning process, the interstitial source systems $108_1$ . . . $108_n$ may submit bids to place interstitial content in association with primary content, and the content composer system 104 may evaluate the bids and optionally based at least in part on the bids, select one or more items to insert into an interstitial pod. The interstitial source systems $108_1$ . . . $108_n$ may be configured to receive signaling to reject the corresponding ad campaign and/or advertiser from the content composer system 104 indicating that a particular item of ancillary content, such as interstitial content, is not to be transmitted to client devices $106_1$ . . . $106_n$ as similarly discussed elsewhere herein. The content composer system 104 may be configured to transmit closed caption messages (e.g., SEI messages) for respective video frames.

The content composer system 104 may be configured to execute processes discussed herein in whole or in part. As similarly described elsewhere herein, the content composer system 104 may be configured to enable users to customize a release schedule for episodes of one or more series. In addition, the content composer system 104 may be configured to link to or otherwise access user calendars and to identify available viewing times using such calendars. Optionally, the content composer system 104 may be configured to generate recommended schedule times for episodes of programs (or other content items) on a user's watchlist and/or to automatically add the episodes (or other content items) to a user's calendar in response to a user acceptance of such recommendations. Such recommendations may be based on data from the user's calendar (e.g., the start and end times of scheduled events, the scheduled events' descriptions and/or notes, the scheduled events attendees, and/or the scheduled events' locations), program episodes' context information (e.g., genre, length, actors, episode number, other such information discussed herein, and/or other related information), and/or user information (e.g., user viewing history and habits, indications as to which program episodes so the user has already viewed, user-specified programs and genres for which recommendations are to be provided (or are not to be provided), user-specified dates and/times for which recommendations are to be scheduled for, and/or user-specified dates and/times that are to be excluded from recommendations, and/or the like).

The system 104 may be configured to generate calendar entries for recommended content viewing (e.g., program episode or other content item viewing) and add the calendar entries to a given user calendar. The calendar entry may include a start time, an end time, a program title, an episode title, a season number, an episode number, a program description, an episode description, and/or other data.

The system 104 may be configured to generate and/or populate user interfaces that enable a user to schedule the release of episodes of a series, accept or reject episode or other content item scheduling recommendations, and/or provide user preferences and/or rules regarding episode or other content item scheduling. As described herein, the system 104 may include one or more learning engines. Such a learning engine may be configured to be used to provide scheduling recommendations and/or analyze calendar entries to classify the calendar entries (e.g., as work or personal). The system 104 may be configured to receive user inputs and instructions and act upon such user inputs and instructions.

Figure 2A:
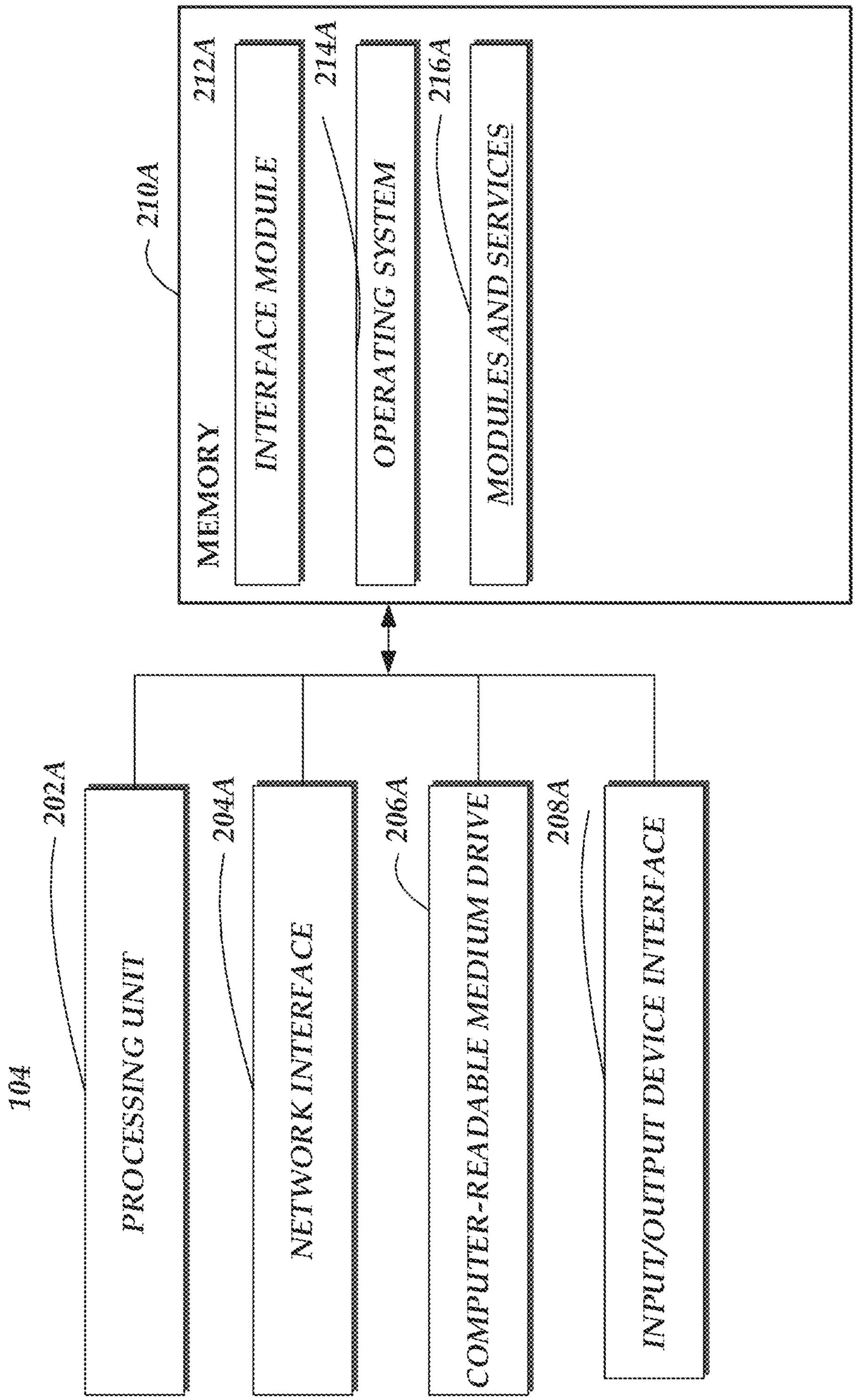
FIG. 2A is a block diagram illustrating example components.

FIG. 2A is a block diagram illustrating example components of the example content composer system 104. The example content composer system 104 includes an arrangement of computer hardware and software components that may be used to implement aspects of the present disclosure. Those skilled in the art will appreciate that the example components may include more (or fewer) components than those depicted in FIG. 2A.

The content composer system 104 may include one or more processing units 202A (e.g., a general purpose processor or artificial intelligence processor (e.g., comprising one or more arithmetic logic units, data registers, an encryption processor, a video transcoder, input/output busses, and/or a high speed graphics processor)), one or more network interfaces 204A, a non-transitory computer-readable medium drive 206A, and an input/output device interface 208A, all of which may communicate with one another by way of one or more communication buses. The network interface 204A may provide the various services described herein with connectivity to one or more networks or computing systems. The processing unit 202A may thus receive information and instructions from other computing devices, systems, or services via a network. The processing unit 202A may also communicate to and from non-transitory computer-readable medium drive 206A and memory 210A and further provide output information via the input/output device interface 208A. The input/output device interface 208A may also accept input from various input devices, such as a keyboard, mouse, digital pen, touch screen, microphone, camera, etc.

The memory 210A may contain computer program instructions that the processing unit 202A may execute to implement one or more features of the present disclosure. The memory 210A generally includes RAM, ROM and/or other persistent or non-transitory computer-readable storage media. The memory 210A may store an operating system 214A that provides computer program instructions for use by the processing unit 202A in the general administration and operation of the modules and services 216A, including its components. The modules and services 216A are further discussed with respect to FIG. 2B and elsewhere herein. The memory 210A may further include other information for implementing aspects of the present disclosure.

In an example embodiment, the memory 210A includes an interface module 212A. The interface module 212A can be configured to facilitate generating one or more interfaces through which a compatible computing device may send to, or receive from, the modules and services 216A.

Figure 2B:
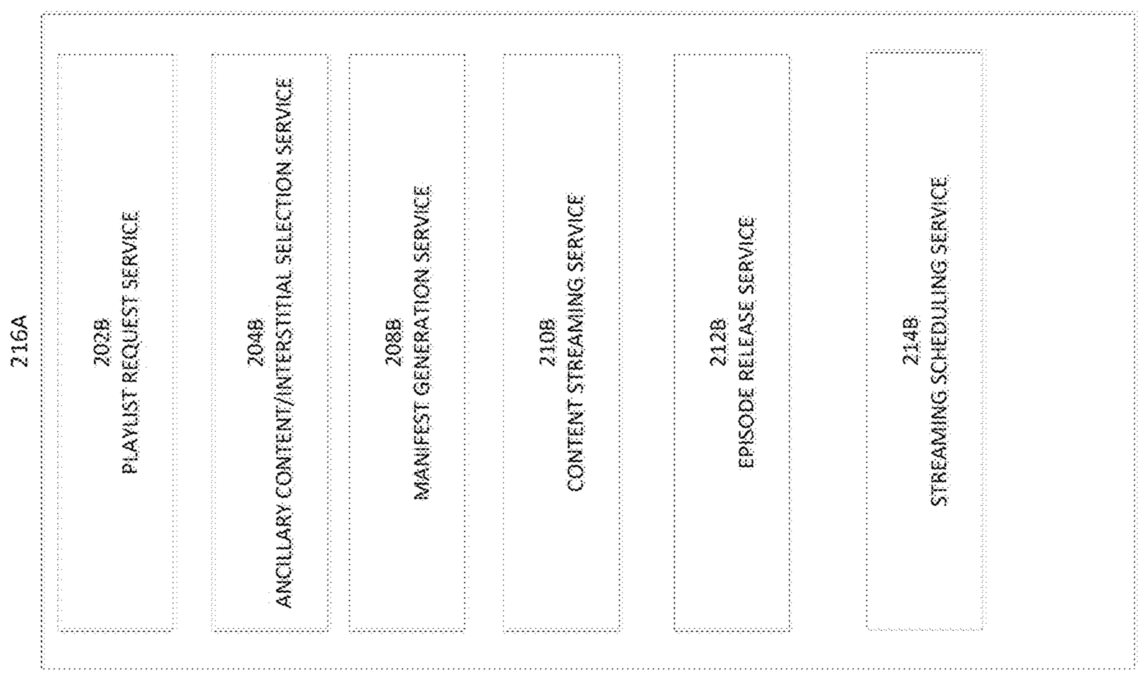
FIG. 2B illustrates example modules and services.

The modules or components described above may also include additional modules or may be implemented by computing devices that may not be depicted in FIGS. 2A and 2B. For example, although the interface module 212A and the modules and services 216A are identified in FIG. 2B as single modules, the modules may be implemented by two or more modules and in a distributed manner. By way of further example, the processing unit 202A may optionally include both a general purpose processor and a video codec. The system 104 may offload certain compute-intensive portions of the modules and services 216A (e.g., transcoding and/or transrating a stream for adaptive bitrate operations, compositing, and/or the like) to one or more dedicated devices, such as a standalone video codec (e.g., H.264 encoders and decoders), while other code may run on a general purpose processor. The system 104 may optionally be configured to support multiple streaming protocols, may provide low latency pass-through, and may support a large number of parallel streams (e.g., HD, 4K, and/or 8K streams).

The processing unit 202A may optionally comprise a graphics processing unit (GPU) that includes hundreds or thousands of core processors configured to process tasks in parallel. The GPU may include high speed memory dedicated for graphics processing tasks. As another example, the system 104 and its components can be implemented by network servers, application servers, database servers, combinations of the same, or the like, configured to facilitate data transmission to and from data stores, user terminals, and third party systems via one or more networks. Accordingly, the depictions of the modules are illustrative in nature.

Referring to FIG. 2B, the modules and services 216A may include modules that provide a playlist request service 202B, an interstitial selection service 204B, a playlist manifest generation service 208B, a content streaming service 210B, episode release service 212B, and a streaming scheduling service 214B.

The playlist request service 202B may receive and process requests for playlist manifests, such as manifests discussed elsewhere herein. The interstitial selection service 204B may assemble context information for a given interstitial pod (e.g., the length of the interstitial pod, the subject matter of requested primary content, information regarding a channel the viewer is watching, the content of a scene in which the interstitial pod is located, etc.) and transmit the information to one or more interstitial source and/or decisioning systems. The interstitial source and/or decisioning systems may propose interstitial content to the interstitial selection service 204B of the stitching system. The interstitial selection service 204B may evaluate the proposals and select one or more items of interstitial content for inclusion in the interstitial pod. The content streaming service 210B may be configured to stream video and other content, such as closed captions.

The manifest generation service 208B may be used to assemble a playlist manifest (e.g., M3U8 for HLS, MPD for DASH) including locators (e.g., URLs) pointing to segments and sections of primary and interstitial content and locators (e.g., URLs), organized to correspond to the desired playback sequence. The manifest file may list the available bitrate versions and their corresponding segments. The manifest file informs the player about the structure of the stream and how to access each segment. The manifest may be transmitted to a client (e.g., a browser or dedicated streaming application) on a user device. The client may then request a given item of content (e.g., section or segment) as needed, which may then be served by the corresponding content source or intermediary to the client.

The encoded video segments and manifest files are packaged and prepared for distribution. For example, the content may be encrypted and protected using a DRM (Digital Rights Management) system. The package content may be uploaded to and distributed via a Content Delivery Network (CDN) for efficient delivery to end-users.

During playback, the client-side player uses the manifest file to dynamically switch between different quality levels based on network conditions and device capabilities. This ensures a smooth viewing experience with minimal buffering.

As similarly described elsewhere herein, the episode release service 212B may determine that a user may be interested in viewing a given series or is currently viewing a series (e.g., based on the user's viewing history and/or based on series/episodes added to the user's watchlist). The episode release service 212B may be configured to cause a user interface to be presented on the user device (e.g., in response to detecting that the user has just completed viewing a first episode of a series or has added a series to a watchlist, or in response to a user activation of a corresponding control) that enables the user to specify at what frequency and/or at what time episodes are to be made available to the user for streaming to the user device.

For example, as similarly discussed elsewhere herein, a user interface may enable the user to control a frequency setting via which the user can control the pace at which the user can watch the next episode of a given series, such as daily, every other day, every third day, weekly, monthly, or other period (even if all the episodes for the series have already been released in actuality to the general user public). Optionally, the user interface enables the user to specify a release interval that is relative to the user viewing of a released episode. Optionally, a user may specify via a user interface the day of the week and/or the time of day on which episodes of a given series are to be released. Optionally, the service 212B may cause a preference user interface to be rendered on the user device via which the user can specify that all series are to be released on a user-specified schedule and/or that certain genres of series are to have their episodes released on a user-specified schedule. The service may add entries corresponding to an episode release schedule to a user calendar.

Optionally, the service 212B may cause a user interface to be rendered on the user device via which the user can override a previously specified release schedule to enable the user to view an episode prior to its "user-scheduled" release. In response to a one-time override for a single episode, the next episode scheduled to be released may be immediately made available to the user.

The streaming scheduling service 214B may provide the scheduling services described herein. For example, the service 214B may gain access to a user's calendar (e.g., to read calendar event entries and/or add entries, such as content viewing entries, to the calendar) by the user \ granting permission to access the user's calendar or the user may provide the service 214B with a link to subscribe to the user's calendar. The service 214B may periodically access the calendar to identify updates or may receive updates pushed by a calendar application or service in real time.

Based on events scheduled on the user's calendar (e.g., based on event entry data such as event description, event start time, event end time, and invitees), the service 214B (e.g., using an artificial intelligence engine such as discussed herein) may generate recommendation(s) for viewing/dates a timing or may automatically stream a given episode or other content item based on the date(s)/time(s) generated by the service 214B. For example, the service 214B may identify unscheduled time periods on the calendar of sufficient length (e.g., e.g., at least as long as the shortest next episode or other content item on the user's watchlist, or at least other threshold length, such as 3 minutes, 6 minutes, or other time period via which short form media or previews may be played) at a typical user viewing times or at user specified viewing times in generating such date/time streaming recommendations and/or in automatically streaming an episode.

For example, the artificial intelligence engine of the service 214B may be utilized. Optionally in addition to other information described herein, some or all of the following calendar event data may be utilized in determining what episodes of what programs or other content items should be scheduled (or recommended to be scheduled) on which dates and times: event title, start and end times, location, participants, description/notes, reminders/alerts, and/or event repetition. For example, the service 214B may identify available time periods in the user's schedule in determining when to schedule a viewing of a given episode of a given series (or other content item) or recommend that the given episode (or other content item) be viewed. The service 214B may optionally compare the time length of available time slots on the user calendar with the length of next unwatched episodes (or other content item) on the user's watchlist, and select episodes (or other content item) that are equal to or shorter than the available time slot. Optionally, the service 214B will select multiple episodes or other content that have a combined length equal to or less than the available time slot.

Optionally, when the service 214B determines there are multiple episodes of different programs or other content from the user's playlist that will fit into an available time slot they may be presented to the user and the user may select which one(s) to view. Optionally, images and/or text (e.g., associated with metadata) corresponding to the identified episodes or other content may be presented via a rotatable carousel user interface comprising a series of respective images (e.g., optionally including video images), although other user interface types may be utilized to present such information to the user. The user may select (e.g., touch or click on) a given item in the carousel and the corresponding content (e.g., episode or other content item) may begin playing or additional corresponding data (e.g., providing more information related to the selected content item, such as ratings, reviews, or other related data) may be caused to be rendered on the user device.

As similarly discussed elsewhere, optionally, an NLP engine may be utilized to determine if a calendar entry is work-related or personal by analyzing the textual content of the calendar entries and classifies the calendar entry accordingly. Such classification may be utilized by the artificial intelligence engine in selecting episodes or other content and/or to select days and/or times for the scheduling of such episodes or other content.

For example, if a series is an on demand series, a home screen may have a "continue watching section" section, a "my shows" section", or the like (which may be generally referred to as a watchlist). The service 214B may cause unwatched episodes of series that a user previously added to their watchlist and specified are to be periodically released to the user to be rendered in the watchlist in accordance with the user-specified release period. If the user has already watched a given episode of a given series, and the next episode is not to be released yet based on the user-specified release schedule/period, then the service 214B may inhibit the next episode from appearing in the watchlist. Optionally, the service 214B may cause the next, unreleased episode to instead appear in the watchlist with a text and/or icon that indicates that the episode is not yet available for viewing and may provide the date at which the episode will be available for viewing (in accordance with the user-specified release schedule/period). Optionally, once an episode is viewed, it will be removed from the watchlist.

If the user does not watch a given episode that has been released in accordance with the user-specified schedule/period, optionally the service 214B will not release the next episode until the given episode is viewed by the user. Optionally, once the given episode is viewed by the user, the next episode will not be "released" by the service 214B to the user until the user-specified interval has elapsed.

The learning engines disclosed herein may comprise one or more neural networks, as similarly discussed above. An example of such a neural network is illustrated in FIG. 3. Such a neural network may be utilized with respect to performing prediction/scheduling as described elsewhere herein. For example, the neural network may be configured and trained to predict user reactions to release recommendations and for using the predictions to determine and schedule (or generate schedule recommendations) placement of such episodes (e.g., to reduce or minimize schedule overrides by the user, to increase or maximize acceptance rates of a release schedule recommendation, to reduce or minimize release rate recommendation edits, and/or to increase or maximize the likelihood that the user will, over time, view all the episodes with respect to a given series). By way of further example, as similarly discussed elsewhere herein, the neural network may be used as part of an NLP processor and may be configured and trained to perform classification of calendar event entries (e.g., as work or personal).

The neural network may contain an input layer 302, one or more hidden layers 304, and an output layer 306. The hidden layers 304 may be configured as convolutional layers, pooling layers, fully connected layers and/or normalization layers. For example, the neural network may be configured with one or more pooling layers that combine outputs of neuron clusters at one layer into a single neuron in the next layer. Max pooling and/or average pooling may be utilized. Max pooling may utilize the maximum value from each of a cluster of neurons at the prior layer. Average pooling may utilize the average value from each of a cluster of neurons at the prior layer.

As similarly discussed elsewhere herein, neural network training data may comprise datasets configured to train the neural network to perform predictions and scheduling. In addition, as similarly discussed elsewhere herein, neural network training data may comprise datasets configured to train the neural network to perform calendar entry classification.

The neural network may be trained based using a supervised or unsupervised process. The neural network layer node weights may be adjusted using backpropagation based on an error function output with respect to the accuracy predictions or classifications to thereby enhance the neural network performance.

FIG. 4 illustrates an example process that enables a user to control the pace of the streaming of episodes of a series. The example process may be utilized using the systems and devices disclosed herein.

At block 402, a determination is made as to whether the user is interested in viewing a particular series comprising a plurality of episodes using one or more of the following techniques. The process may access a watchlist created by the user and determine whether the series is on the watchlist, which indicates that the user is interested in viewing the particular series. By way of further example, a determination may be made that the user has viewed the first episode of the series or liked an episode in a series. By way of additional example, the user viewing histories comprising shows and movies the user has watched, and associated genres, actors, user ratings, watch durations, and viewing frequency may be utilized in predicting a series a user may be interested in viewing. The user's search history of keywords and titles may be utilized in predicting a series a user may be interested in viewing. The user's demographic information (e.g., age, gender, location, number of family members, and/or the like) may be utilized in predicting a series a user may be interested in viewing. Collaborative filtering may optionally be utilized to predict a series a user may be interested in viewing, wherein the prediction is based at least in part on series that users with similar tastes (as determined from their viewing history) have viewed and given positive ratings to. Thus, User-Item Filtering may be utilized, which identifies series that similar users have liked. Item-Item Filtering may be utilized, which identifies series that are similar to ones the user has viewed and given positive ratings to. Optionally, machine learning techniques, such as those described herein, may be utilized to predict whether a user would be interested in viewing a series (e.g., based on historical user viewing data, search data, demographics, and/or other data disclosed herein).

Based on the determination that the user may be interested in viewing a particular, at block 404, a user interface is caused to be presented on a user device that enables the user to control a frequency setting via which the user can control the pace/frequency at which the user can watch the next episode of the series (e.g., daily, every other day, every third day, weekly, monthly, or other period (even if all the episodes for the series have been released in actuality)). The user interface may be presented via a browser or a dedicated application configured to provide streaming services.

For example, if a first episode of a series is released, and the user specified that the release interval is weekly, then the second episode will be released one week after the user actually completed viewing the first episode. Optionally, the user interface enables the user to specify the day of the week on which episodes are to be released and/or the time of day.

At block 406, the user specification as to the viewing pace (and optionally day of the week and time of day for the episode release) is received from the user interface.

At block 408, a determination may be made as to whether an episode is to be released to the user. For example, if it is a first episode of the series (which had already been released to users generally), the user may be provided access to the first episode for streaming to the user device, regardless of the release pace specified by the user. If it is not a first episode, a determination may be made as to whether the user viewed the last episode from the series released to the user. If the user still has not viewed the episode from the last series released to the user, the process may optionally inhibit the user from accessing the next episode regardless of the episode release pace specified to the user (optionally subject to a cancellation by the user of the release pace or a temporary override of the release pace).

If the user has viewed the episode from the series last released to the user, the process may determine whether the next episode of the series is to be released to the user using the user-specified release pace (e.g., a user-specified release period or frequency), the date the last episode was viewed by the user (wherein the user had completed watching the episode, optionally excluding the credits), and a current date (and optionally day of week and time) accessed from a calendar (e.g., using a date object in JavaScript, a LocalDate class in Java, using an operating system's API, or the like).

If the time difference between the date of the last episode viewing by the user and the current date is less than the user specified release period/interval, the next episode will not be released to the user util the process determines that the time difference between the date of the last episode viewed by the user and the current date is equal to or greater than the user specified release period/interval, then at block 410 the next episode will be released to the user (and optionally will be presented to the user in a "watch next" category presented to the user, wherein the use can select the newly released episode for watching). Optionally, a corresponding viewing time for the newly released episode may be added to a user calendar (e.g., at an available time period of sufficient length for the episode as similarly discussed elsewhere herein and/or at an available time period of sufficient length at a time selected to better distribute loading over time with respect to the streaming systems and network) and/or inserted into an electronic program guide customized for and presented to the user via the user device. Optionally, the newly released episode may be inserted into multiple time periods in the electronic program guide, wherein the process may remove the episode from future time periods in the electronic program guide once the process determines that the user has viewed the newly released episode.

At block 412, a determination may be made as to whether the user has viewed the newly released episode. Once the process determines that the newly released episode has been viewed, the process may proceed back to block 408, and a determination may be made as to whether the next episode is to be released. Once the process determines that all the episodes have been released to the user, the process may end.

Figure 5:
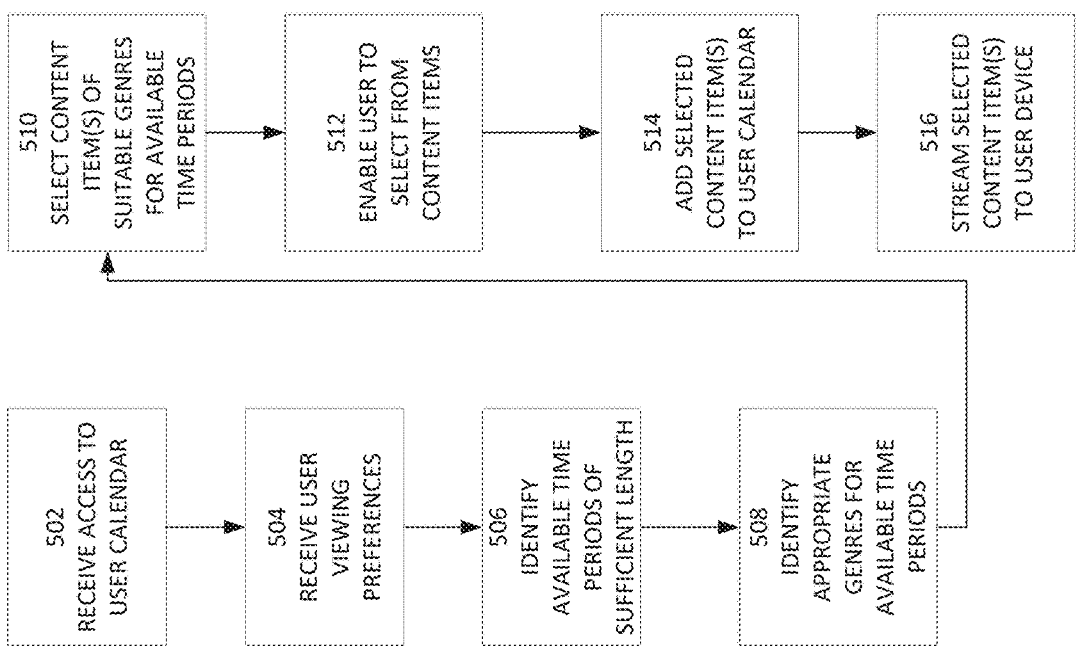
FIG. 5 illustrates an example process.

FIG. 5 illustrates an example process of scheduling programs for a user during detected available times on a user's calendar and for optionally providing load distribution over time of streaming servers and networks with respect to such scheduling. The process may be executed using the systems and devices disclosed herein.

At block 502, the process is granted access to a calendar of a user (e.g., to read calendar event entries and/or to add content viewing entries to the calendar). The calendar may be hosted by an online service, a user device, a streaming service, and/or otherwise. For example, the user may provide permission (e.g., via a link to the calendar) to the process to enable a streaming system (such as disclosed herein) to access the calendar. Optionally, the system may access the user calendar via an Application Programming Interface (API). The process may periodically access the calendar to identify updates (e.g., newly scheduled events, deleted events, or edited events as reflected in calendar entries) or may receive updates pushed by a calendar application or service in real time.

At block 504, a user interface may optionally be presented to the user device configured to enable the user to specify times and/or days at which the user prefers that content (e.g., movies, series, sporting events, and/or other content which may be streamed) be scheduled for viewing. The user interface may also be configured to specify times and/or days at which the user prefers that content not be scheduled for viewing. Such preferences may be received over a network and stored in memory for later access.

At block 506, a user watchlist of content items and/or a list of multi-episode series the user has begun watching may be accessed from memory along with metadata indicating their time length. The process may access the user calendar. The process may use a learning engine, such as described elsewhere herein and/or the user's preferences and identify available times in the calendar that correspond to the user's preferences as when content is to be shown that are sufficiently long to accommodate one or more items of content from the user watchlist and/or one or more episodes from the list of multi-episode series the user has begun watching.

Optionally, historical streaming server utilization and/or network access may be accessed from memory. The process may be configured to utilize such utilization data to identify peak server and/or network utilization time periods or time periods with a utilization greater than a specified threshold and may exclude such time periods from the time periods that are available for scheduled. This will help balance the load on streaming servers and networks over time and will reduce that number of servers and network bandwidth needed to handle peak streaming and will enable higher resolution content to be delivered to user devices.

At block 508, an artificial intelligence engine (e.g., a learning engine) may be utilized to identify appropriate genres of content to be shown at respective available time periods. For example, based on events scheduled on the user's calendar (e.g., based on event entry data such as event description, event start time, event end time, and invitees), a determination may be made as to whether calendared events are work or personal and may make a genre selection comprising one or more genres using such information. By way of example, the genre selection may comprise comedies and reality shows (e.g., selected from genres comprising news, talk shows, game shows, variety shows, sketch comedy, sports, sitcoms, romantic comedies, teen dramas, docudramas, police procedurals, science fiction, fantasy, anime, soap operas, and/or reality programs).

In addition, the user's viewing history may be accessed indicating what genres of content the user watched at different days, different times of days, and/or adjacent to different calendared events or types of calendared events. This information may also be utilized in making a genre selection.

At block 510, content items of the suitable genre (e.g., as determined from metadata associated with the content items) and of the suitable time (as determined at block 506) may be selected from the user watchlist of content items and/or a list of multi-episode series the user has begun watching. As discussed elsewhere herein, multiple content items of multiple suitable genres may be selected to fill an available time period.

At block 512, the selected content items for a given time period may be presented to the user in the form of representative images and/or identifying/descriptive text. Optionally, images and/or text corresponding to the identified content may be presented via a rotatable carousel user interface comprising a series of respective images (e.g., optionally including video images) as similarly discussed elsewhere herein. The user may select (e.g., touch or click on) a given item in the carousel and at block 514, the selected items may be added to the corresponding times on the user's calendar. The calendar entry may comprise a corresponding program name, episode name/number (e.g., season number and episode number), and/or a link to the episode. The episode link may comprise a URL or other locator to the corresponding episode.

At block 516, if the user is accessing the corresponding streaming application, the calendared content may automatically begin streaming to the user's device for playback. Optionally in addition or instead, a calendar reminder comprising some or all of the corresponding calendar entry may be generated and provided to the user. The user may select the locator in the reminder, and in response the content item may begin streaming to the user device, or a play control may be provided in association with an image of the content item, wherein activation of the play control causes the content item to stream to the user device.

Thus, disclosed herein are methods and systems configured to control the pacing and timing of video streaming and viewing in a customized manner. Optionally, advantageously, the disclosed methods and systems may be configured to control the timing of streaming content so as to reduce peak loading on streaming infrastructure.

An aspect of the present disclosure relates to a system configured to control streaming of content, comprising: a computer device; non-transitory computer readable memory having program instructions stored thereon that when executed by the computer device cause the system to perform operations comprising: access a first calendar of a user, the first calendar comprising a plurality of calendar entries; analyze the first calendar to identify future unscheduled time periods; use a first learning engine to classify at least a portion of the plurality of calendar entries into one or more subject types; access a watchlist associated with the user, the watchlist comprising a plurality of content items of respective time lengths; provide the identified future unscheduled time periods, the classification of the at least a portion of the plurality of calendar entries into one or more subject types, and the time lengths of the plurality of content items to a second learning engine; use the second learning engine to generate a scheduling recommendation of at least one item of content on the user watchlist; transmit the scheduling recommendation of at least one item of content on the user watchlist over a network to a first device of the user; at least partly in response to an acceptance of the scheduling recommendation from the user, cause a calendar entry to be generated corresponding to the scheduling recommendation of at least one item of content on the user watchlist; and enable the at least one item of content on the user watchlist to be streamed to the first device of the user in accordance with the accepted scheduling recommendation.

Optionally, the scheduling recommendation is generated based in part on historical data regarding timing of utilization of a streaming infrastructure. Optionally, the scheduling recommendation is generated based in part on historical data regarding load timing of a streaming infrastructure. Optionally, the second learning engine comprises an input layer, an output layer, a plurality of hidden layers, the plurality of hidden layers comprising multiple fully connected layers with activation functions. Optionally, the one or more subject types comprises a work event. Optionally, the system is configured to recommend a plurality of content items to be scheduled. Optionally, using the second learning engine to generate the scheduling recommendation of at least one item of content on the user watchlist further comprises using the second learning engine to generate the scheduling recommendation of a plurality of content items on the user watchlist for a first unscheduled time period, wherein in a total time length of the plurality of content items is equal to or less that the first unscheduled time period. Optionally, the calendar entry generated corresponding to the scheduling recommendation of at least one item of content on the user watchlist comprises a link to a first content item, wherein activation of the link to the first content item causes the first content item to be played or causes a play control to be rendered on the first device of the user in association with an image corresponding to the first content item.

An aspect of the present disclosure relates to a computer implemented method, the method comprising: accessing a first calendar of a user, the first calendar comprising a plurality of calendar entries; analyzing the first calendar to identify future unscheduled time periods; accessing a watchlist associated with the user, the watchlist comprising a plurality of content items of respective time lengths; providing the identified future unscheduled time periods and the time lengths of the plurality of content items to a learning engine; using the learning engine to generate a scheduling recommendation of at least one item of content on the user watchlist; transmitting the scheduling recommendation of at least one item of content on the user watchlist over a network to a first device of the user; at least partly in response to an acceptance of the scheduling recommendation from the user, causing a calendar entry to be generated corresponding to the scheduling recommendation of at least one item of content on the user watchlist; and enabling the at least one item of content on the user watchlist to be streamed to the first device of the user in accordance with the accepted scheduling recommendation.

Optionally, the scheduling recommendation is generated based in part on historical data regarding timing of utilization of a streaming infrastructure. Optionally, the scheduling recommendation is generated based in part on historical data regarding load timing of a streaming infrastructure. Optionally, the learning engine comprises an input layer, an output layer, a plurality of hidden layers, the plurality of hidden layers comprising multiple fully connected layers with activation functions. Optionally, the method further comprising classifying at least a portion of the plurality of calendar entries into one or more subject types, wherein the one or more subject types comprises a work event, wherein using the learning engine to generate a scheduling recommendation of at least one item of content on the user watchlist further comprises using the classification of the plurality of calendar entries into one or more subject types to generate the scheduling recommendation of at least one item of content on the user watchlist. Optionally, using the learning engine to generate the scheduling recommendation of at least one item of content on the user watchlist further comprises using the learning engine to generate the scheduling recommendation of a plurality of content items on the user watchlist for a first unscheduled time period, wherein in a total time length of the plurality of content items is equal to or less that the first unscheduled time period. Optionally, the calendar entry generated corresponding to the scheduling recommendation of at least one item of content on the user watchlist comprises a link to a first content item, wherein activation of the link to the first content item causes the first content item to be played or causes a play control to be rendered on the first device of the user in association with an image corresponding to the first content item.

An aspect of the present disclosure relates to a system configured to control streaming of content, comprising: a computer device; non-transitory computer readable memory having program instructions stored thereon that when executed by the computer device cause the system to perform operations comprising: determine an interest of a user in a first video series comprising a plurality of episodes; based at least in part on the determined interest of the user in the first video series comprising the plurality of episodes, cause a viewing pace specification user interface to be presented on a first device of the user; receive over a network, from the user via the viewing pace specification user interface, an episode release interval specification for the first video series; at least partly in response to receiving from the user via the viewing pace specification user interface, an episode release interval specification for the first video series, inhibit the user from accessing a plurality of episodes of the first video series that have already been generally released to users; determine if the user has streamed an initial episode in the first video series to the first device of the user; at least partly in response to determining that the user has streamed the initial episode in the first video series; determine if the episode release interval specification specified by the user is satisfied; at least partly in response to determining that the episode release interval specification is satisfied, enable the user to stream a next episode; and at least partly in response to an input of the user, cause the next episode to be streamed to the user device.

Optionally, the system is configured to release the next episode at a time of day selected at least in part on historical data regarding timing of utilization of a streaming infrastructure. Optionally, the system is configured to utilize a learning engine to generate a release schedule for the user, the learning engine comprising an input layer, an output layer, a plurality of hidden layers, the plurality of hidden layers comprising multiple fully connected layers with activation functions. Optionally, determining an interest of the user in the first video series comprising a plurality of episodes further comprises determining if the user added the first video series to a watchlist. Optionally, determining an interest of the user in the first video series comprising a plurality of episodes further comprises using User-Item Filtering which identifies series that other users similar to the user and/or using Item-Item Filtering which identifies series that are similar to ones the user has viewed and given positive ratings to. Optionally, determining an interest of the user in the first video series comprising a plurality of episodes further comprises determining that the user viewed the initial episode of the first series. Optionally, receiving over the network, from the user via the viewing pace specification user interface, the episode release interval specification for the first video series, further comprises receiving a day of the week specification on which episodes of the first video series are to be released. Optionally, the system is configured to provide a user interface enabling the user to override the episode release interval specification for the first video series. Optionally, at least partly in response to determining that the episode release interval specification specified by the user is satisfied, the system is configured to add the next episode to a continue watching watchlist render on the first device.

An aspect of the present disclosure relates to a computer implemented method, the method comprising: determining an interest of a user in a first video series comprising a plurality of episodes; based at least in part on the determined interest of the user in the first video series comprising the plurality of episodes, causing a viewing pace specification user interface to be presented on a first device of the user; receiving over a network, from the user via the viewing pace specification user interface, an episode release interval specification for the first video series; at least partly in response to receiving from the user via the viewing pace specification user interface, an episode release interval specification for the first video series, inhibiting the user from accessing a plurality of episodes of the first video series that have already been generally released to users; determining if the user has streamed an initial episode in the first video series to the first device of the user; at least partly in response to determining that the user has streamed the initial episode in the first video series; determining if the episode release interval specification specified by the user is satisfied; at least partly in response to determining that the episode release interval specification is satisfied, enabling the user to stream a next episode; and at least partly in response to an input of the user, causing the next episode to be streamed to the user device.

Optionally, the method further comprising releasing the next episode at a time of day selected at least in part on historical data regarding timing of utilization of a streaming infrastructure. Optionally, the method further comprising using a learning engine to generate a release schedule for the user, the learning engine comprising an input layer, an output layer, a plurality of hidden layers, the plurality of hidden layers comprising multiple fully connected layers with activation functions. Optionally, determining an interest of the user in the first video series comprising a plurality of episodes further comprises determining if the user added the first video series to a watchlist. Optionally, determining an interest of the user in the first video series comprising a plurality of episodes further comprises using User-Item Filtering which identifies series that other users similar to the user and/or using Item-Item Filtering which identifies series that are similar to ones the user has viewed and given positive ratings to. Optionally, determining an interest of the user in the first video series comprising a plurality of episodes further comprises determining that the user viewed the initial episode of the first series. Optionally, receiving over the network, from the user via the viewing pace specification user interface, the episode release interval specification for the first video series, further comprises receiving a day of the week specification on which episodes of the first video series are to be released. Optionally, the method further comprising providing a user interface enabling the user to override the episode release interval specification for the first video series. Optionally, at least partly in response to determining that the episode release interval specification specified by the user is satisfied, adding the next episode to a continue watching watchlist render on the first device.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc. While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system configured to control streaming of content, comprising:

a computer device;

non-transitory computer readable memory having program instructions stored thereon that when executed by the computer device cause the system to perform operations comprising:

access a first calendar of a user, the first calendar comprising a plurality of calendar entries;

analyze the first calendar to identify future unscheduled time periods;

use a first learning engine to classify at least a portion of the plurality of calendar entries into one or more subject types;

access a watchlist associated with the user, the watchlist comprising a plurality of content items of respective time lengths;

provide the identified future unscheduled time periods, the classification of the at least a portion of the plurality of calendar entries into one or more subject types, and the time lengths of the plurality of content items to a second learning engine;

use the second learning engine to generate a scheduling recommendation of at least one item of content on the user watchlist;

transmit the scheduling recommendation of at least one item of content on the user watchlist over a network to a first device of the user;

at least partly in response to an acceptance of the scheduling recommendation from the user, cause a calendar entry to be generated corresponding to the scheduling recommendation of at least one item of content on the user watchlist; and enable the at least one item of content on the user watchlist to be streamed to the first device of the user in accordance with the accepted scheduling recommendation.

2. The system as defined in claim 1, wherein the scheduling recommendation is generated based in part on historical data regarding timing of utilization of a streaming infrastructure.

3. The system as defined in claim 1, wherein the scheduling recommendation is generated based in part on historical data regarding load timing of a streaming infrastructure.

4. The system as defined in claim 1, wherein the second learning engine comprises an input layer, an output layer, a plurality of hidden layers, the plurality of hidden layers comprising multiple fully connected layers with activation functions.

5. The system as defined in claim 1, wherein the one or more subject types comprises a work event.

6. The system as defined in claim 1, wherein the system is configured to recommend a plurality of content items to be scheduled.

7. The system as defined in claim 1, wherein using the second learning engine to generate the scheduling recommendation of at least one item of content on the user watchlist further comprises using the second learning engine to generate the scheduling recommendation of a plurality of content items on the user watchlist for a first unscheduled time period, wherein in a total time length of the plurality of content items is equal to or less that the first unscheduled time period.

8. The system as defined in claim 1, wherein the calendar entry generated corresponding to the scheduling recommendation of at least one item of content on the user watchlist comprises a link to a first content item, wherein activation of the link to the first content item causes the first content item to be played or causes a play control to be rendered on the first device of the user in association with an image corresponding to the first content item.

9. A computer implemented method, the method comprising:

accessing, using a computer system comprising one or more processing devices, a first calendar of a user, the first calendar comprising a plurality of calendar entries;

analyzing, using the computer system, the first calendar to identify future unscheduled time periods;

classifying at least a portion of the plurality of calendar entries into one or more subject types, wherein the one or more subject types comprises a work event;

accessing a watchlist associated with the user, the watchlist comprising a plurality of content items of respective time lengths;

providing the identified future unscheduled time periods and the time lengths of the plurality of content items to a learning engine;

using the learning engine to generate a scheduling recommendation of at least one item of content on the user watchlist, wherein using the learning engine to generate a scheduling recommendation of at least one item of content on the user watchlist further comprises using the classification of the plurality of calendar entries into one or more subject types to generate the scheduling recommendation of at least one item of content on the user watchlist;

transmitting the scheduling recommendation of at least one item of content on the user watchlist over a network to a first device of the user;

at least partly in response to an acceptance of the scheduling recommendation from the user, causing a calendar entry to be generated corresponding to the scheduling recommendation of at least one item of content on the user watchlist; and enabling the at least one item of content on the user watchlist to be streamed to the first device of the user in accordance with the accepted scheduling recommendation.

10. The computer implemented as defined in claim 9, wherein the scheduling recommendation is generated based in part on historical data regarding timing of utilization of a streaming infrastructure.

11. The computer method implemented as defined in claim 9, wherein the scheduling recommendation is generated based in part on historical data regarding load timing of a streaming infrastructure.

12. The computer implemented method as defined in claim 9, wherein the learning engine comprises an input layer, an output layer, a plurality of hidden layers, the plurality of hidden layers comprising multiple fully connected layers with activation functions.

13. The computer implemented method as defined in claim 9, wherein using the learning engine to generate the scheduling recommendation of at least one item of content on the user watchlist further comprises using the learning engine to generate the scheduling recommendation of a plurality of content items on the user watchlist for a first unscheduled time period, wherein in a total time length of the plurality of content items is equal to or less that the first unscheduled time period.

14. The computer implemented method as defined in claim 9, wherein the calendar entry generated corresponding to the scheduling recommendation of at least one item of content on the user watchlist comprises a link to a first content item, wherein activation of the link to the first content item causes the first content item to be played or causes a play control to be rendered on the first device of the user in association with an image corresponding to the first content item.

* * * * *